United States Patent
Ma et al.

(10) Patent No.: US 7,120,095 B2
(45) Date of Patent: Oct. 10, 2006

(54) APPARATUS FOR GENERATING SEEK DIRECTION DETECTING SIGNAL USING TRACK ERROR AND TRACK CROSS SIGNALS FOR AN OPTICAL PICKUP

(75) Inventors: Byung-in Ma, Suwon (KR); Chong-sam Chung, Suwon (KR); In-sik Park, Suwon (KR); Byoung-ho Choi, Suwon (KR); Tae-yong Doh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 09/815,345

(22) Filed: Mar. 23, 2001

(65) Prior Publication Data

US 2002/0003756 A1    Jan. 10, 2002

(30) Foreign Application Priority Data

Mar. 23, 2000    (KR) .............................. 2000-14818

(51) Int. Cl.
*G11B 7/00*    (2006.01)
(52) U.S. Cl. .............................. 369/44.28; 369/44.35; 369/44.37; 369/33.41; 369/120
(58) Field of Classification Search ................ 369/120, 369/44.35, 44.37, 44.28, 44.11, 44.41, 33.41
See application file for complete search history.

(56) References Cited

U.S. PATENT DOCUMENTS

| | | | | | |
|---|---|---|---|---|---|
| 4,425,636 | A | * | 1/1984 | Musha et al. ............ | 369/44.37 |
| 4,904,856 | A | * | 2/1990 | Nagahama et al. ....... | 250/201.5 |
| 4,908,506 | A | * | 3/1990 | Coops et al. ............ | 250/201.5 |
| 5,515,353 | A | * | 5/1996 | Miyazaki et al. ....... | 369/112.04 |
| 5,706,263 | A | * | 1/1998 | Lee et al. ................ | 369/44.41 |
| 5,820,241 | A | * | 10/1998 | Wortel ......................... | 353/31 |
| 5,822,295 | A | * | 10/1998 | Sohmuta ..................... | 369/118 |
| 5,986,996 | A | * | 11/1999 | Kitamura et al. ....... | 369/112.16 |

* cited by examiner

*Primary Examiner*—Gautam R. Patel
(74) *Attorney, Agent, or Firm*—Stein, McEwen & Bui, LLP

(57) ABSTRACT

An apparatus to generate a seek direction detecting signal for an optical pickup to determine a position of a center of an optical spot focused on an optical disk relative to a center of a track, which focuses a main beam on a first optical detector and a sub-beam having a predetermined aberration in a radial direction on a second optical detector using a light dividing unit. The second optical detector has an inner and an outer pair of light receiving portions arranged along the radial direction, the inner pair being between the outer pair. A signal processing portion includes a first signal processing portion to detect a track error signal from signals output from the first optical detector, and a second signal processing portion to generate the seek direction detecting signal from signals detected by the second optical detector and the track error signal.

42 Claims, 9 Drawing Sheets

RADIAL TILT

FIG. 15

TANGENTIAL TILT

APPARATUS FOR GENERATING SEEK DIRECTION DETECTING SIGNAL USING TRACK ERROR AND TRACK CROSS SIGNALS FOR AN OPTICAL PICKUP

CROSS-REFERENCE TO RELATED APPLICATIONS

This application claims the benefit of Korean Application No. 2000-14818, filed Mar. 23, 2000, in the Korean Industry Property Office, the disclosure of which is incorporated herein by reference.

BACKGROUND OF THE INVENTION

1. Field of the Invention

The invention relates to an apparatus to generate a seek direction detecting signal for an optical pickup to determine the relative position of a center of an optical spot focused on an optical disk with respect to a center of a disk track in a RAM-type optical disk having a land/groove structure, and more particularly, to an apparatus to generate a seek direction detecting signal for an optical pickup using a main beam and a sub-beam having a predetermined aberration in a radial direction.

2. Description of the Related Art

In general, an optical pickup apparatus optically records or reproduces information of an optical disk, such as a RAM type disk, which is used as a recording medium to record/reproduce information. A conventional optical pickup apparatus comprises a light source to emit laser light, an objective lens to converge light emitted from the light source on an optical disk to form an optical spot on the optical disk, an optical detector to receive light reflected from the optical disk and to detect an information signal and an error signal, and a signal processing portion to process the detected signals.

Figure 1:
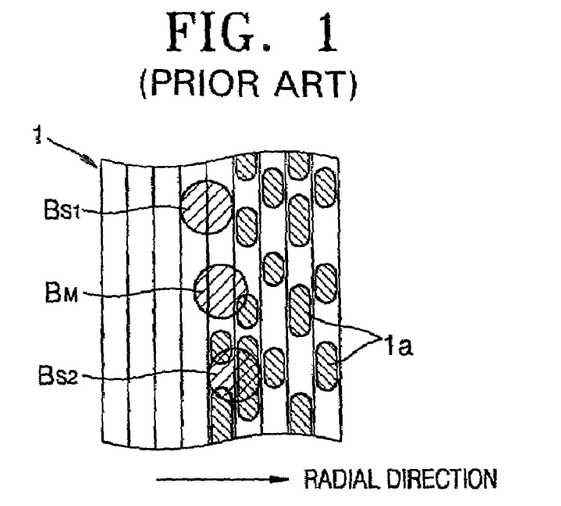
FIG. 1 is a schematic diagram illustrating optical spots focused on an optical disk using a conventional optical pickup.
Figure 2:
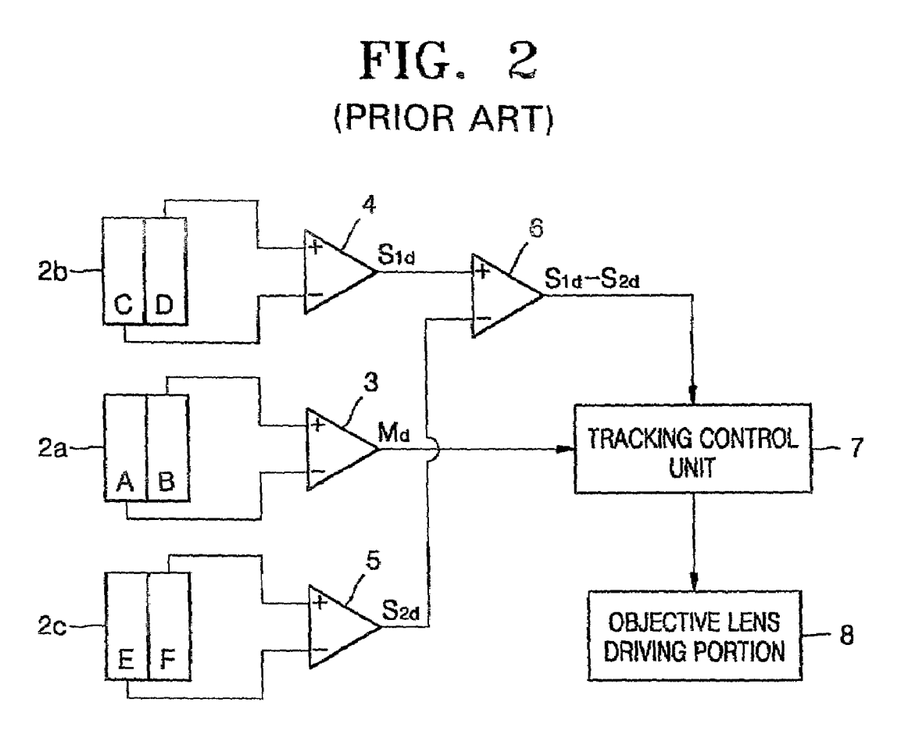
FIG. 2 is a schematic diagram illustrating a conventional apparatus to generate a seek direction detecting signal for an optical pickup.

Referring to FIGS. 1 and 2, a conventional apparatus to generate a seek direction detecting signal for an optical pickup comprises a grating (not shown) to illuminate both a track and adjacent tracks at the same time so as to record/reproduce information, an optical detector, and a signal processing portion.

As shown in FIG. 1, a spiral track having a land (L) and groove (G) structure is formed on an optical disk 1, and information marks 1a are formed on the lands (L) and grooves (G). When information is recorded on or reproduced from the optical disk 1, light beams diverged by the grating are focused on the disk 1. That is, a main beam $B_M$ is focused on the track to record/reproduce the information marks 1a, and first and second sub-beams $B_{S1}$ and $B_{S2}$, which respectively precede and follow the main beam $B_M$ by a predetermined time, are focused on tracks of the optical disk 1 to be ±½ track pitch off the main beam $B_M$ in a radial direction of the optical disk 1.

As shown in FIG. 2, the optical detector includes a main optical detector 2a to receive the main beam $B_M$ reflected from the optical disk 1, and first and second optical sub-detectors 2b and 2c to receive the first and second sub-beams $B_{S1}$ and $B_{S2}$, respectively. The main optical detector 2a comprises two separate plates A and B that are separated in the radial direction of the optical disk 1 and independently receive light. In addition, the first and second optical sub-detectors 2b and 2c comprise two separated plates C and D, and two separated plates E and F also separated in the radial direction of the optical disk 1, respectively.

The signal processing portion comprises a plurality of differential amplifiers 3, 4, 5, and 6 to differentiate and amplify the signals detected by the main optical detector 2a, and the first and second optical sub-detectors 2b and 2c to detect a track error signal (TES) and a track cross signal (TCS), a tracking control unit 7 to receive the detected TES and TCS and to output a tracking control signal, and an objective lens driving portion 8 to actuate an objective lens (not shown) according to the input tracking control signal.

The TES uses a push-pull signal Md output from the main optical detector 2a. The TCS uses a difference signal $S_{1d}-S_{2d}$ of push-pull signals $S_{1d}$ and $S_{2d}$ respectively output from the first and second optical sub-detectors 2b and 2c, and the push-pull signal $M_d$. Since the first and second sub-beams $B_{S1}$ and $B_{S2}$ are disposed ±½ track pitch off the main beam $B_M$, and the push-pull signals $S_{1d}$ and $S_{2d}$ have phase differences of ±90° with respect to the push-pull signal $M_d$, the TCS can be detected using the phase differences.

While the conventional apparatus to generate the seek direction detecting signal for an optical pickup has an advantage in that the TCS can be detected in a relatively simple manner using the three beams, there is a problem in that, since the first and second sub-beams $B_{S1}$ and $B_2$ are disposed to precede and follow the main beam $B_M$, cross erasures occur on adjacent track signals when a RAM-type optical disk is used.

SUMMARY OF THE INVENTION

To solve the above and other problems, it is an object of the invention to provide an apparatus to generate a seek direction detecting signal for an optical pickup to determine the relative position of a center of an optical spot focused on a RAM-type optical disk having a land/groove structure with respect to a center of a disk track using a main beam, and a sub-beam having a predetermined aberration in the radial direction.

Additional objects and advantages of the present invention will be set forth in part in the description which follows and, in part, will be obvious from the description, or may be learned by practice of the present invention.

Accordingly, to achieve the above and other objects according to an embodiment of the present invention, an apparatus to generate a seek direction detecting signal for an optical pickup comprises a light dividing unit to divide an incident light beam into a main beam and a sub-beam to form a main beam spot and a sub-beam spot having an optical aberration, the main beam and sub-beam being focused in a track direction of an optical disk, the light dividing unit being disposed so that a direction of the optical aberration of the sub-beam spot is in a radial direction of the optical disk; an optical detector including a first optical detector having a light receiving portions to receive the main beam reflected from the optical disk, and to convert portions of the received beam into independent electrical signals, and a second optical detector to receive the sub-beam reflected from the optical disk, and to convert portions of the received beam into independent electrical signals; and a signal processing portion including a first signal processing portion to detect a track error signal from the electrical signals output from the first optical detector; and a second signal processing portion to generate a seek direction detecting signal from the electrical signals detected by the second optical detector.

According to another aspect of the present invention, the second optical detector includes a pair of first and second inner light receiving portions arranged in a direction corresponding to the radial direction of the optical disk, and a pair of first and second outer light receiving portions disposed at outer sides of the first and second inner light receiving portions, respectively; and the second signal processing portion generates the seek direction detecting signal from the electrical signals detected by the first and second outer light receiving portions, and the first and second inner light receiving portions.

In addition, according to another embodiment of the present invention, an apparatus to generate a seek direction detecting signal for an optical pickup comprises a light dividing unit to divide an incident light beam into a main beam and a sub-beam to form a main beam spot and a sub-beam spot having an optical aberration, the main beam and the sub-beam being focused in a track direction of an optical disk, the light dividing unit being disposed so that the direction of the optical aberration of the sub-beam spot is in a radial direction of the optical disk; an optical detector including a first optical detector having a plurality of light receiving portions to receive the main beam reflected from the optical disk, and to convert portions of the received beam into independent electrical signals; and the second optical detector having first, second, and third light receiving portions divided into three portions in the direction corresponding to a tangential direction of the optical disk, and fourth, fifth, and sixth light receiving portions disposed adjacent to the first, second, and third light receiving portions, respectively, in a direction corresponding to the radial direction, and divided into three portions in a direction corresponding to the tangential direction to receive the sub-beam reflected from the optical disk and to convert portions of the received beam into independent electrical signals; and a signal processing portion including a first signal processing portion to detect a track error signal from the electrical signals output from the first optical detector; and a second signal processing portion to generate the seek direction detecting signal by differentiating a sum of the signals output from the first, third, and fifth light receiving portions, and the sum of the signals output from the second, fourth, and sixth light receiving portions.

BRIEF DESCRIPTION OF THE DRAWINGS

The above and other objects and advantages of the present invention will become more apparent and more readily appreciated from the following description of the preferred embodiments with reference to the accompanying drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Figure 3:
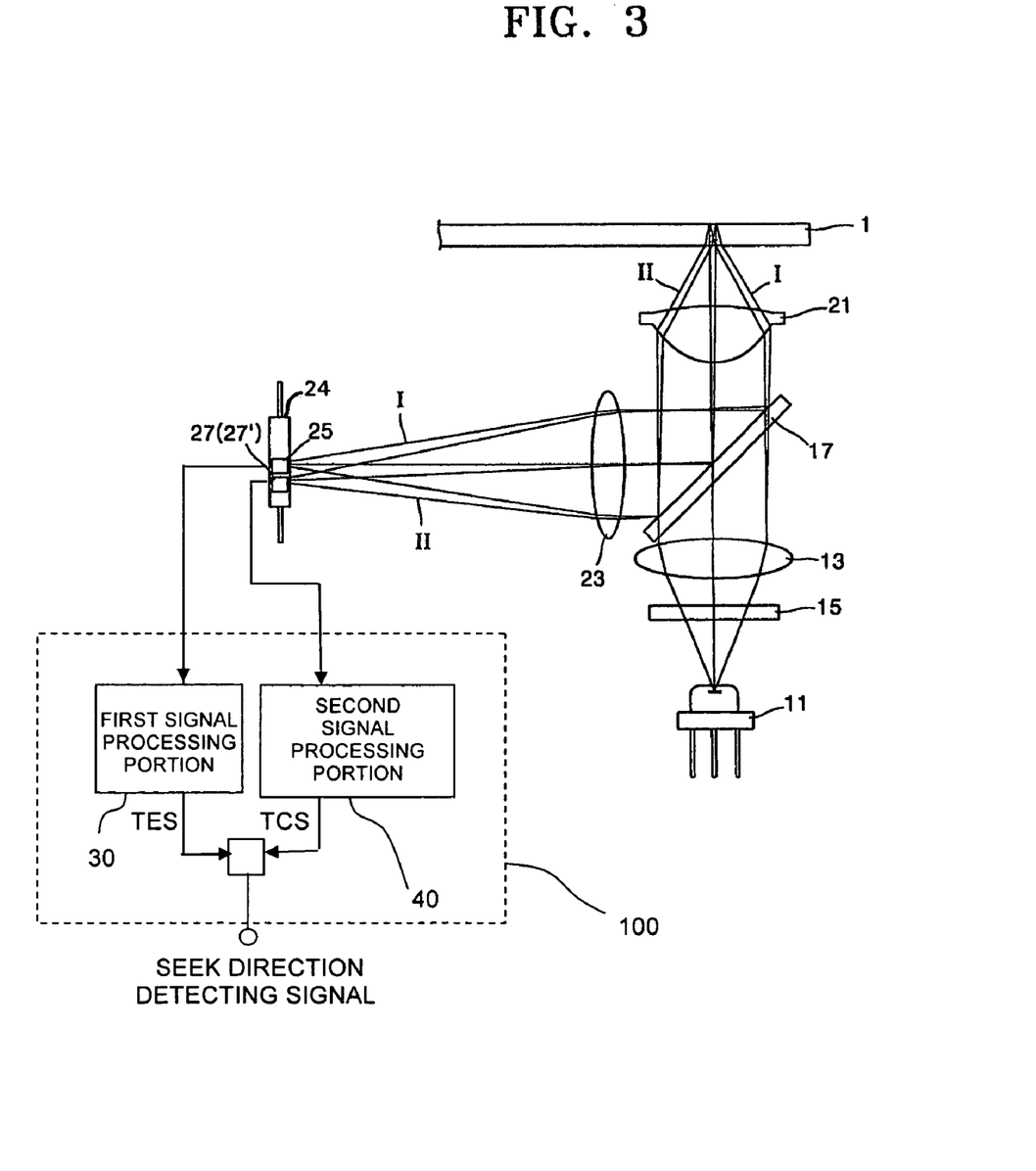
FIG. 3 is a diagram illustrating the optical layout of an optical pickup apparatus using an apparatus to generate a seek direction detecting signal according to an embodiment of the present invention.

As shown in FIG. 3, an optical pickup apparatus that uses an apparatus to generate a seek direction detecting signal according to the present invention includes a light source 11, an optical path changing unit 17 that changes the light path of an incident beam, an objective lens 21 to converge the incident beam, and an apparatus to generate a seek direction detecting signal. The apparatus to generate the seek direction detecting signal includes a light dividing unit 15 disposed between the light source 11 and the optical disk 1, an optical detector 24 to receive the beam reflected from the optical disk 1, and a signal processing portion 100 to process the detected beam.

In order to enhance the recording capacity of an optical disk 1 having a capacity of greater than 15 GB, the light source 11 has a wavelength of about 410 nm, and the objective lens 21 has a numerical aperture equal to or greater than 0.6. The diverging light emitted from the light source 11 passes through a collimating lens 13, and is converged to be a collimated beam. The optical path changing unit 17 is provided on the optical path between the light source 11 and the objective lens 21 so as to change the path of the incident beam. That is, the incident beam from the light source 11 is directed toward the objective lens 21, and the incident beam from the objective lens 21 is directed toward the optical detector 24. The shown optical path changing unit 17 comprises a beam splitter 17 that changes the path of the incident beam by dividing the incident beam in a predetermined ratio, passing some portions of the incident beam, and reflecting the remainder.

Figure 4:
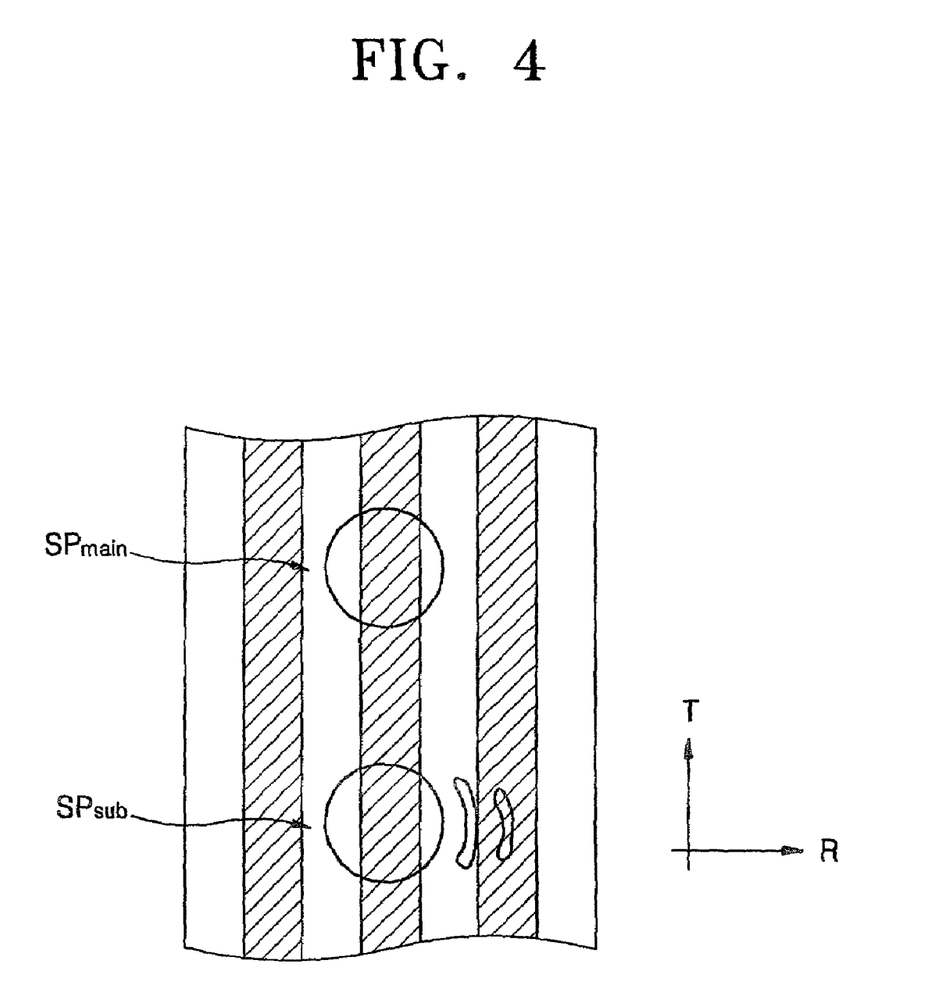
FIG. 4 is a schematic diagram illustrating a main beam spot $SP_{main}$ and a sub-beam spot $SP_{sub}$ formed on an optical disk according to an embodiment of the present invention.

The beam emitted from the light source 11 is diverged into at least two beams including a main beam I and a sub-beam II by the light dividing unit 15, and forms a main beam spot $SP_{main}$ and a sub-beam spot $SP_{sub}$, as shown in FIG. 4. Here, the main beam I forms the main beam spot $SP_{main}$, which does not have any aberration, and the sub-beam II forms a sub-beam spot $SP_{sub}$, which has a predetermined optical aberration such as a coma.

In order to form the main beam spot $SP_{main}$ and the sub-beam spot $SP_{sub}$ as described above, when the optical disk 1 is placed in the optical pickup apparatus without being inclined, the light dividing unit 15 comprises a holographic optical element 15 to divide the incident beam into the main beam I comprising a 0th order diffracted beam, and the sub-beam II comprising a 1st order diffracted beam, and to give the sub-beam II the predetermined aberration. As such, the sub-beam II has the predetermined aberration while the main beam I does not have any aberration. Further, the optical axis of the sub-beam II is formed to be both slanted with respect to the optical axis of the main beam I due to the coma, and to travel along a light path that is inclined at a predetermined angle with respect to the radial direction R of the optical disk 1, and forms the sub-beam spot $SP_{sub}$ on the optical disk 1. In order to give the sub-beam the coma as described above, the holographic optical element 15 has a predetermined hologram pattern.

While not shown, it is understood that the light dividing unit 15 may be designed to form a sub-beam spot which precedes the main beam spot $SP_{main}$ instead of the sub-beam spot $SP_{sub}$ which follows the main beam spot $SP_{min}$. In addition, the light dividing unit 15 may be designed to form a pair of sub-beam spots $SP_{sub}$, one of which precedes the main beam spot $SP_{main}$, and another which follows the main beam spot $SP_{main}$.

The objective lens 21 converges the main beam I and the sub-beam II diverged by the holographic optical element 15, and focuses the beams I and II on the optical disk 1. The sub-beam II is focused on the same track as the main beam I. However, the sub-beam II has an aberration in the radial direction R, given by the holographic optical element 15 described above.

Figure 5:
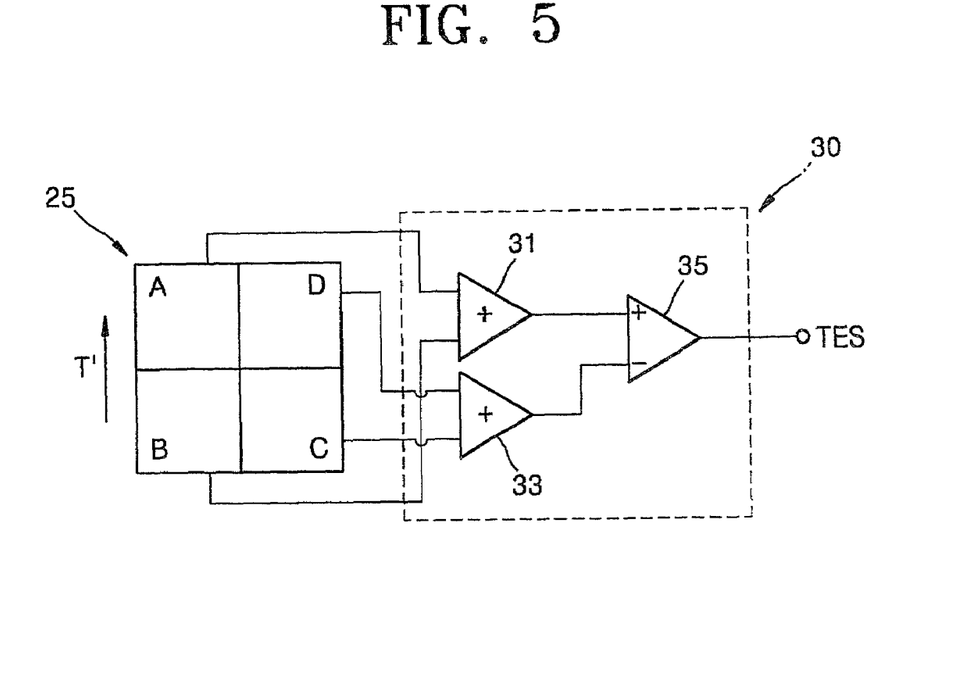
FIG. 5 is a schematic diagram illustrating a first optical detector according to an embodiment of the present invention, and a first signal processing portion to process signals output from the first optical detector.

After the main beam I and the sub-beam II, which are reflected from the optical disk 1, pass through the objective lens 21 and are reflected by the beam splitter 17, the main beam I and the sub-beam II are converged by a converging lens 23 and are received by the optical detector 24. The optical detector 24 comprises a first optical detector 25 to receive the main beam I, and a second optical detector 27 or 27' to receive the sub-beam II. As shown in FIG. 5, the first optical detector 25 has a plurality of receiving portions A, B, C, and D to receive the main beam I, and to convert the respective optical signals into independent electrical signals.

Figure 6:
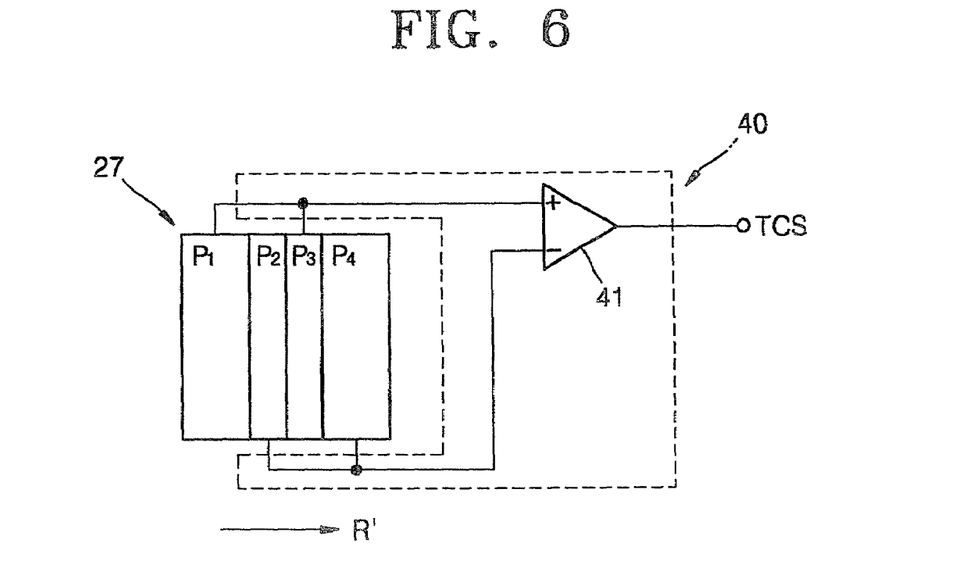
FIG. 6 is a schematic diagram illustrating a second optical detector according to another embodiment of the present invention, and an embodiment of a second signal processing portion to process signals output from the second optical detector.

As shown in FIG. 6, the second optical detector 27 according to an embodiment of the present invention receives the sub-beam II, and converts the optical signals into electrical signals. The second optical detector 27 has four receiving portions $P_1$, $P_2$, $P_3$, $P_4$ arranged in a direction R' corresponding to the radial direction R of the optical disk 1 to independently perform opto-electric conversion. This arrangement is intended so that, even when there is a radial tilt on the RAM-type optical disk 1 used as an optical recording medium which has a groove/land structure, a signal having a similar phase difference as a signal detected when there is no radial tilt can be detected.

To this end, the second optical detector 27 has a pair of first and second inner light receiving portions $P_2$ and $P_3$, and a pair of first and second outer light receiving portions $P_1$ and $P_4$ which are disposed at the outer sides of the first and second inner light receiving portions $P_2$ and $P_3$, respectively. In order to generate the seek direction detecting signal, it is preferable that the widths of the first and second inner light receiving portions $P_2$ and $P_3$ are smaller than the radius of an incident beam spot focused on the second optical detector 27. More preferably, the widths of the first and second inner light receiving portions $P_2$ and $P_3$ are 0.2 to 0.8 times the radius of the incident beam spot focused on the second optical detector 27.

Figure 7:
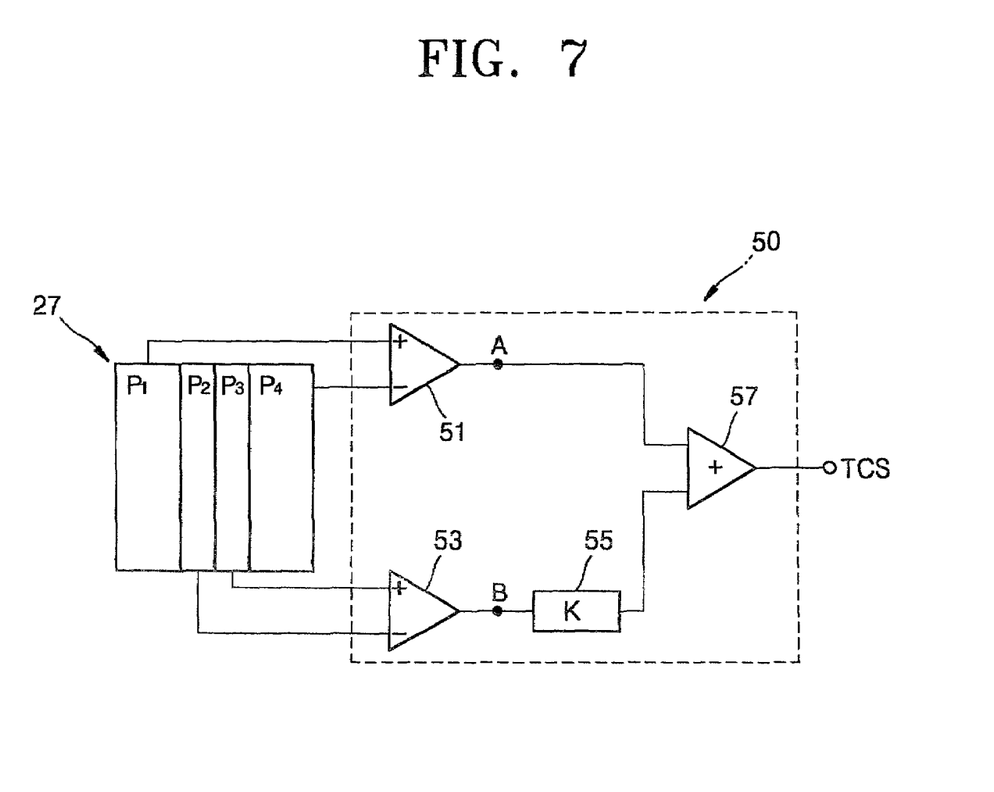
FIG. 7 is a schematic diagram illustrating yet another embodiment of the second signal processing portion according to the present invention.

Referring to FIGS. 5 through 7, the signal processing portion 100 includes a first signal processing portion 30 to detect a track error signal (TES) from the signals output from the first optical detector 25, and a second signal processing portion 40 to generate a track cross signal (TCS) used to generate the seek direction detecting signal from the signals detected by the second optical detector 27.

As shown in FIG. 5, the first signal processing portion 30 sums and differentiates electrical signals output from the four light receiving portions A, B, C, D of the first optical detector 25, and outputs the TES. The first signal processing 30 comprises a summing amplifier 31 to sum signals detected by the two light receiving portions A and B disposed side by side in the direction T' corresponding to the tangential direction T of the optical disk shown in FIG. 4, a summing amplifier 33 to sum signals detected by the two light receiving portions D and C, and a differential amplifier 35 to differentiate and amplify the signals output from the two summing amplifiers 31 and 33. That is, the first signal processing portion 30 outputs the TES using push-pull signals output from the main beam I.

Referring to FIG. 6, the second signal processing portion 40 according to an embodiment of the present invention includes a differential amplifier 41 to differentiate signals input from the second optical detector 27, and to output a track cross signal (TCS). The sum of signals output from the first outer light receiving portion Pi and the second inner light receiving portion $P_3$ is $S_{(P1+P3)}$, and the sum of signals output from the first inner light receiving portion $P_2$ and the second outer light receiving portion $P_4$ is $S_{(P2+P4)}$. The differential amplifier 41 differentiates the signal $S_{(P1+P3)}$ and the signal $S_{(P2+P4)}$, and outputs the TCS. The seek direction detecting signal for an optical disk 1 is generated using the phase difference between the TCS output from the second signal processing portion 40 and the TES.

Referring FIG. 7, a second signal processing portion 50 according to another embodiment of the present invention includes first and second differential amplifiers 51 and 53 to differentiate signals input from the second optical detector 27, a gain adjusting unit 55 to adjust the gain of the differentiated signal output signal from the second differential amplifier 53, and a summing amplifier 57 to sum the adjusted signals and output the TCS. That is, the signals $S_{P1}$ and $S_{P4}$ are output from the first and second outer light receiving portions $P_1$ and $P_4$, and the signals $S_{P1}$ and $S_3$ are output from the first and second inner light receiving portion $P_2$ and $P_3$. The first differential amplifier 51 differentiates the signals $S_{P1}$ and $S_{P4}$, and outputs a signal $S_{(P1-P4)}$, and the second differential amplifier 53 differentiates the signals $S_{P2}$ and $S_{P3}$, and outputs a signal $S_{(P3-P2)}$. The gain adjusting unit 55 multiplies the signal $S_{(P3-P2)}$ output from the second differential amplifier 53 by a predetermined gain coefficient K, and outputs a signal K×$S_{(P3-P2)}$. The summing amplifier 57 sums the signal $S_{(P1-P4)}$ and the signal K×$S_{(P3-P2)}$, and outputs the TCS. Therefore, the seek direction detecting signal can be generated using the phase difference between the TCS output from the summing amplifier 57 and the TES output from the first signal processing portion 30.

While not shown, it is understood that the gain adjusting unit 55 could be used to adjust the gain of the differentiated signal output signal from the first differential amplifier 51 instead of or in addition to the differentiated signal from the second differential amplifier 53.

The structures of the second signal processing portion according to the above-described embodiments are shown as examples when the sub-beam spot $SP_{sub}$ is disposed as shown in FIG. 4. Therefore, it is understood that when a sub-beam spot precedes the main beam spot, when a pair of sub-beam spots, one of which precedes the main beam spot and another which follows the main beam spot, or when the aberration direction of the sub-beam spot is changed, the phase of the signal output from the second signal processing portion may be inverted. As such, while not shown, it is understood that the inverted phase can be corrected by changing the input end of the differential amplifier or by using an inverter Now, referring to FIGS. 8 through 12, the operation of the apparatus to generate the seek direction detecting signal for an optical pickup according to an embodiment of the present invention will be described. In FIGS. 8 through 12, the horizontal axis represents track positions by using a track pitch ($T_P$) of an optical disk 1, and the vertical axis represents magnitudes of an output signal at the track positions. Here, the track pitch $T_P$ is the distance between the center of a land and the center of an adjacent groove, or between the center of a groove and the center of an adjacent land in a land/groove structure for recording or reproducing a signal onto or from the optical disk 1. Further, the numbers 1, 2, 3, . . . along the x-axis of the graph indicate distances corresponding to 1 time, 2 times, 3 times, . . . the track pitch $T_P$. That is, in the horizontal axis, the points indicated by 0, 2, 4, and 6 are the centers of respective grooves, the points indicated by 1, 3, and 5 are the centers of respective lands.

Figure 8:
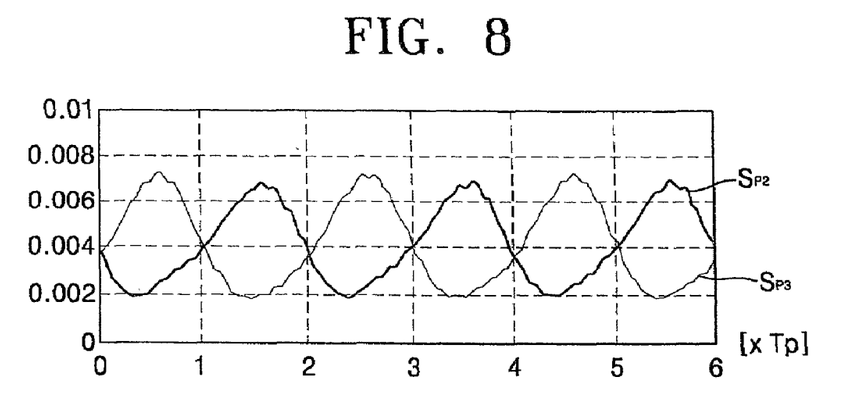
FIG. 8 is a diagram illustrating waveforms of signals output from the first and second inner light receiving portions of the second optical detector shown in FIG. 7 when the beam spots are in off-track states.
Figure 9:
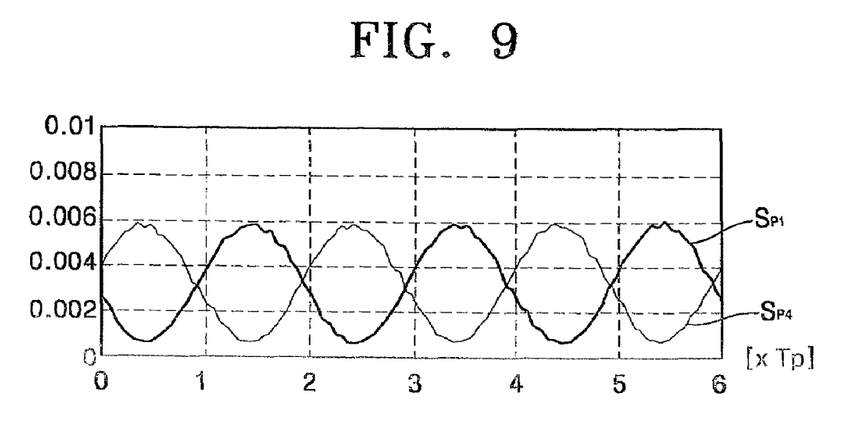
FIG. 9 is a diagram illustrating waveforms of signals output from the first and second outer light receiving portions of the second optical detector shown in FIG. 7 when the beam spots are in off-track states.
Figure 10:
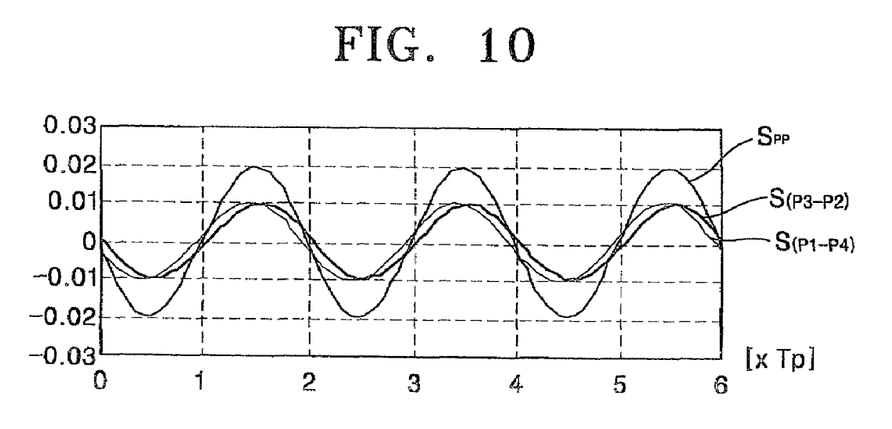
FIG. 10 is a diagram illustrating waveforms of push-pull signals at the points A and B, and a waveform of a push-pull signal of the whole second optical detector when beam spots are in off-track states.

FIGS. 8 and 9 show waveforms of signals $S_{P2}$ and $S_{P3}$ output from the first and second inner light receiving portions $P_2$ and $P_3$, and signals $S_{P1}$ and $S_{P4}$ output from the first and second outer light receiving portions $P_1$ and $P_4$ of the second optical detector 27 when the beam spots are in off-track states, and the aberration of the sub-beam II in the radial direction is 0.5 degrees. FIG. 10 shows waveforms of push-pull signals $S_{(P1-P4)}$ and $S_{(P3-P2)}$ at points A and B of FIG. 7, and a push-pull signal $S_{PP}$ output from the second optical detector when the beam spots are in off-track states.

Figure 11:
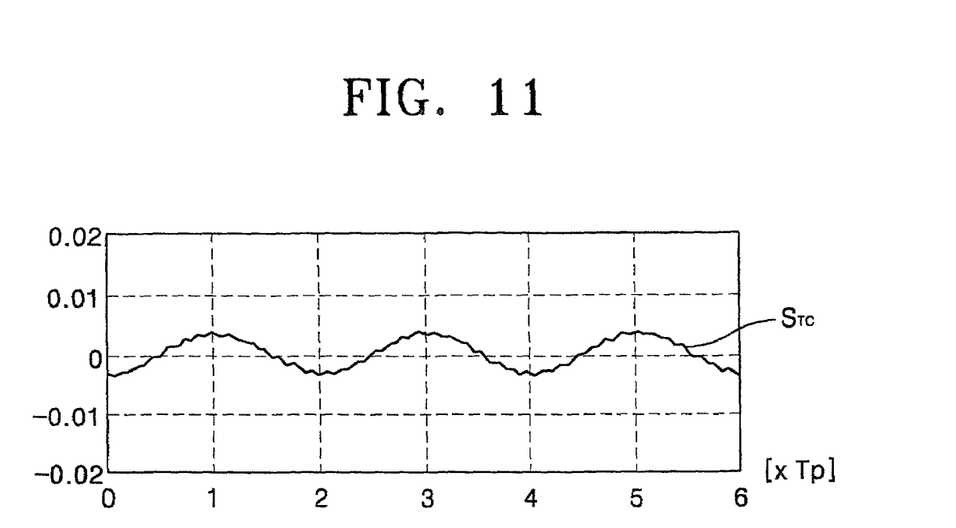
FIG. 11 is a diagram illustrating a waveform of a track cross signal when the beam spots are in off-track states.

As shown in FIG. 10, since the sub-beam II has a predetermined aberration in the radial direction of the optical disk, the push-pull signals $S_{(P1-P4)}$ and $S_{(P3-P2)}$ exhibit minimum differences at the track centers (i.e., at the points of 1, 2, 3, . . . of the horizontal axis). In addition, when the two signals $S_{(P1-P4)}$ and $S_{(P3-P2)}$ are differentiated, the result is a track cross signal STC as shown in FIG. 11 has the track cross signal STC with a 90° phase difference with respect to the push-pull signal $S_{PP}$.

As also noted above, the waveform shown in FIG. 11 can be inverted according to the direction of the aberration applied to the sub-beam II in the radial direction. Further, the magnitude of the signal varies with the value of the aberration according to the radial tilt of the sub-beam II.

Figure 12:
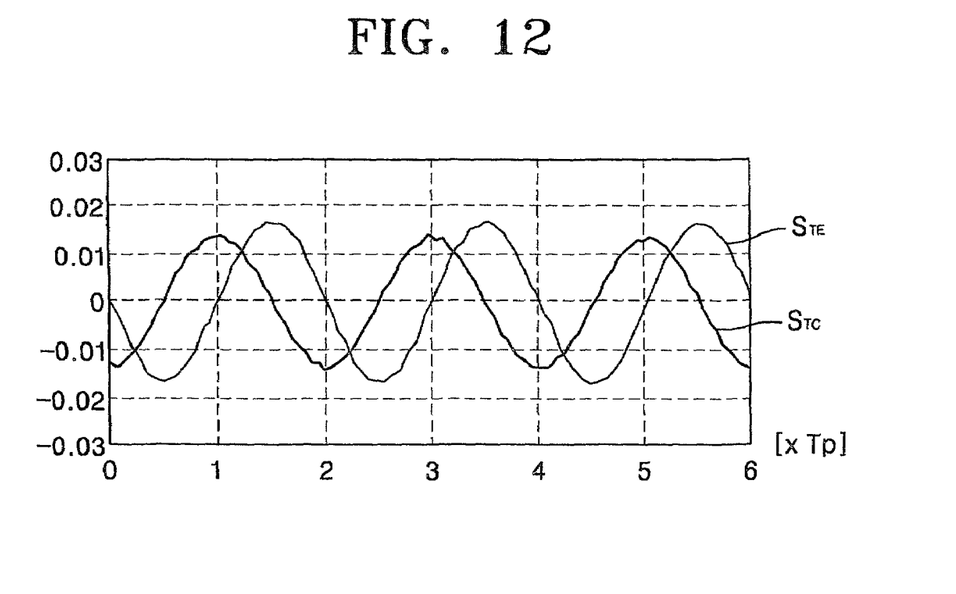
FIG. 12 is a diagram illustrating waveforms of a track cross signal and a track error signal when beam spots are in off-track states.

FIG. 12 shows waveforms of a track cross signal $S_{TC}$ and a track error signal $S_{TE}$ when beam spots are in off-track states, and when the aberration of the sub-beam in the radial direction is 1.0 degree. That is, the waveforms show the values of the signals when the numerical aperture of an optical pickup is 0.65, the wavelength of a light source is 400 nm, and the track widths of a land and a groove are 0.37 μm and when the sub-beam II has an aberration having a radial tilt of 0.5 degrees with respect to the recording surface of the optical disk 1.

Reviewing FIG. 12, it can be seen that, at the points 1, 2, 3, . . . along the horizontal axis, the signal $S_{TC}$ has peak values, and the signal $S_{TE}$ has a value of 0. Since there is a phase difference between two signals, a signal can be generated, which can be used when a seek operation is performed (i.e., the laser beam spot is moved to a target track), when the relative position of the beam spot with respect to a track on which desired information is recorded, and the movement direction of the beam spot are detected.

Figure 13:
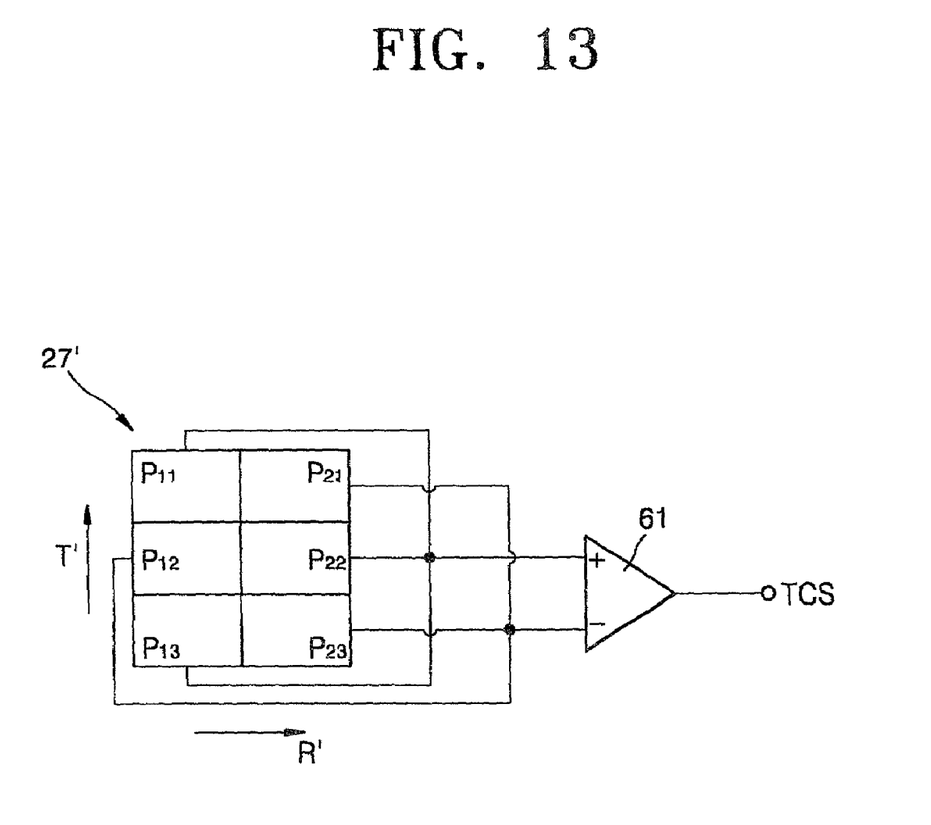
FIG. 13 is a schematic diagram illustrating a second optical detector according to another embodiment of the present invention, and another embodiment of the second signal processing portion to process the signal output from the second optical detector.

Referring to FIG. 13, a second optical detector 27' according to another embodiment of the present invention receives the sub-beam II shown in FIG. 3, and converts the received optical signal into an electrical signal. The second optical detector 27' has six light receiving portions $P_{11}$, $P_{12}$, $P_{13}$, $P_{21}$, $P_{22}$ and $P_{23}$ which are formed by dividing the second optical detector 27' into two portions in the direction R' corresponding to the radial direction R of the optical disk 1, and into three portions in the direction T' corresponding to the tangential direction T shown in FIG. 4. This division is intended so that, even when there is a radial tilt on the RAM-type optical disk 1, a signal having a similar phase difference to a signal detected when there is no radial tilt is detected.

To this end, the second optical detector 27' includes first, second, and third light receiving portions $P_{11}$, $P_{12}$, and $P_{13}$ along the direction T', and fourth, fifth, and sixth light receiving portions $P_{21}$, $P_{22}$, and $P_{23}$ disposed adjacent with the first, second, and third light receiving portions $P_{11}$, $P_{12}$, and $P_{13}$, respectively, in the direction R'. The fourth, fifth and sixth light receiving portions $P_{21}$, $P_{22}$, $P_{23}$ are disposed along the direction T'. The second signal processing portion comprises a differential amplifier 61 to differentiate a signal input from the second optical detector 27', and to output a track cross signal (TCS), as shown in FIG. 13. A sum signal $S_{(P11+P13+P22)}$ is output from the first, third, and fifth light receiving portions $P_{11}$, $P_{13}$, and $P_{22}$, and a sum signal $S_{(P12+P21+P23)}$ is output from the second, fourth, and sixth light receiving portions $P_{12}$, $P_{21}$, and $P_{23}$. The differential amplifier 61 differentiates the signals $S_{(P11+P13+P22)}$ and $S_{(P12+P21+P23)}$ and outputs a track cross signal (TCS). The TCS has the same type of waveform as the signal $S_{TC}$ shown in FIG. 12. Here, the seek direction detecting signal of the optical disk is generated using the phase difference between the TCS output from the differential amplifier 61 and the TES output from the first signal processing portion 30 (FIG. 5).

Figure 14:
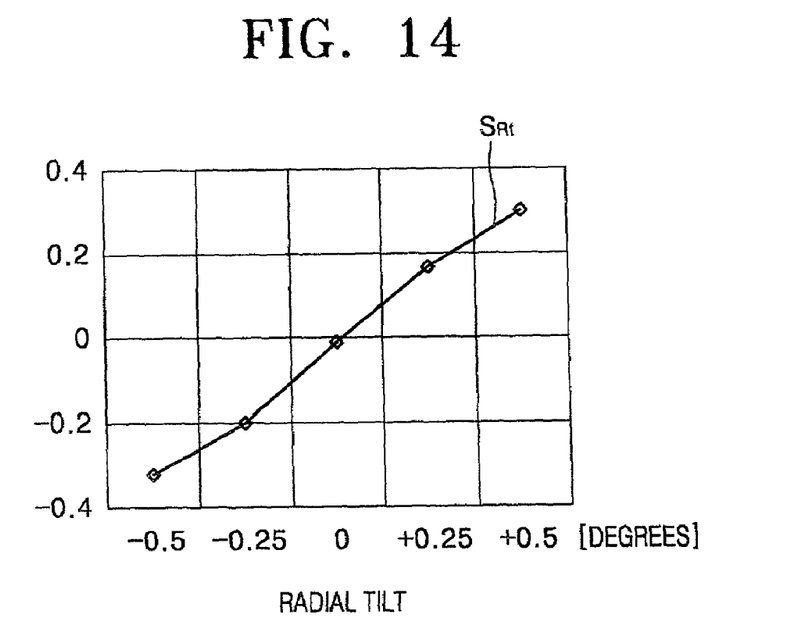
FIG. 14 is a graph illustrating a track cross signal according to variations in the radial tilt output from the second signal processing portion shown in FIG. 13.

FIG. 14 shows a TCS according to variations in the radial tilt output from the second signal processing portion when the second optical detector 27' and the second signal processing portion are used as described above. That is, FIG. 14 shows the magnitudes of the TCS according to the values of the radial tilt when the sub-beam II has a radial tilt component with respect to the optical disk 1 while the main beam I has a radial tilt of 0 degrees. Reviewing FIG. 14, it can be found that the magnitude of the TCS according to the value of the radial tilt varies linearly.

Figure 15:
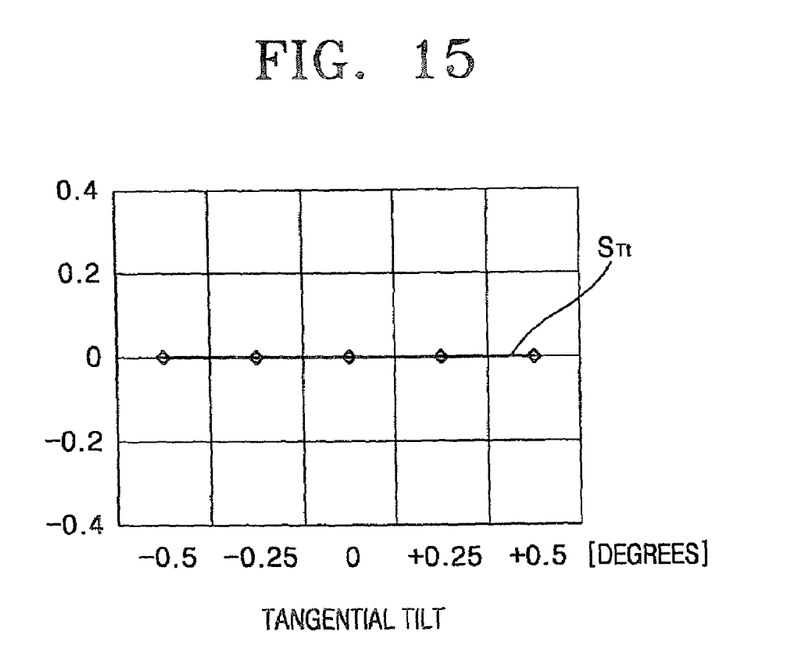
FIG. 15 is a graph illustrating a track cross signal according to variations in the tangential tilt output from the second signal processing portion shown in FIG. 13.

FIG. 15 is a graph illustrating a TCS according to variations in the tangential tilt output from the second signal processing portion shown in FIG. 13. Reviewing FIG. 15, it can be found that, when there is a tilt in the optical disk 1 in the tangential direction within ±0.5 degree, the TCS is normally generated without being affected by the tilt in the tangential direction.

With the present invention, since the relative position of the center of a beam spot focused on a RAM-type optical disk having a land/groove structure with respect to the center of a disk track can be discriminated with a main beam and a sub-beam having a predetermined aberration in the radial direction disposed in the same track, a problem in which cross erasure occurs due to the use of first and second sub-beams in the conventional art can be solved fundamentally. In addition, since the main beam and the sub-beam are disposed in the same line, there is an advantage in that a high-speed access is possible.

Although a few preferred embodiments of the present invention have been shown and described, it would be appreciated by those skilled in the art that changes may be made in this embodiment without departing from the principles and spirit of the present invention, the scope of which is defined in the claims and their equivalents.

What is claimed is:

1. An apparatus to generate a seek direction detecting signal for an optical pickup, comprising:
    a light dividing unit to divide an incident light beam into a main beam and a sub-beam to form on an optical disk a main beam spot and a sub-beam spot having an optical aberration, the main beam and the sub-beam being focused in a track direction of the optical disk, the light dividing unit being disposed so that a direction of the optical aberration is formed on the optical disk in a radial direction of the optical disk;
    an optical detector comprising
    a first optical detector having light receiving portions to receive the main beam reflected from the optical disk, and to convert portions of the reflected main beam into independent first electrical signals, and
    a second optical detector to receive the sub-beam reflected from the optical disk, and to convert portions of the received sub-beam into independent second electrical signals; and
    a signal processing portion to generate the seek direction detecting signal from a generated second signal and a generated track error signal, the signal processing portion comprising:
        a first signal processing portion to detect the track error signal from the first electrical signals, and
        a second signal processing portion to generate the second signal from the second electrical signals.

2. The apparatus as claimed in claim 1, wherein the second optical detector comprises
    an inner pair of first and second inner light receiving portions arranged in a direction corresponding to the radial direction of the optical disk, and
    an outer pair of first and second outer light receiving portions disposed at outer sides of the first and second inner light receiving portions, respectively; and
    the second electrical signals used by the second signal processing portion and which are used to generate the second signal used to generate the seek direction detecting signal with the track error signal include the second electrical signals respectively detected by the outer pair of first and second outer light receiving portions, and the inner pair of first and second inner light receiving portions.

3. The apparatus as claimed in claim 2, wherein widths of the first and second inner light receiving portions are narrower than a radius of a beam spot of the incident light beam focused on said optical detector.

4. The apparatus as claimed in claim 3, wherein a combined width of the first and second inner light receiving portions is 0.2 to 0.8 times a diameter of a beam spot of the incident light beam focused on said optical detector.

5. The apparatus as claimed in claim 2, wherein:
    the second signal processing portion includes a differential amplifier that differentiates both the second electrical signal of the outer pair of the first and second outer receiving portions and the second electrical signal of the inner pair of the first and second inner receiving portions, and outputs a track cross signal included in the second signal; and
    the signal processing portion generates the seek direction detecting signal using a phase difference between the track cross signal and the track error signal.

6. The apparatus as claimed in claim 2, wherein,
    the second electrical signals output from the outer pair of the first and second outer light receiving portions are $S_{p1}$ and $S_{p4}$, the second electrical signals output from the inner pair of the first and second inner light receiving portions are $S_{p2}$ and $S_{p3}$,
    the second signal processing portion comprises
        a first differential amplifier to differentiate the signals $S_{p1}$ and $S_{p4}$ and to output a signal $S_{(p1-p4)}$,
        a second differential amplifier to differentiate the signals $S_{p2}$ and $S_{p3}$ and to output a signal $S_{(p3-p4)}$,
        a gain adjusting unit to multiply the electrical signal output from the second differential amplifier by a predetermined gain coefficient K, and to output a signal $K \times S_{(P3-P2)}$, and
        a summing amplifier to sum the signal $S_{(p1-p4)}$ and the signal $K \times S_{(p3-p2)}$, and to output a track cross signal included in the second signal, and
    the signal processing portion generates the seek direction detecting signal using a phase difference between the track cross signal and the track error signal.

7. The apparatus as claimed in claim 1, wherein:
    the second optical detector comprises first, second, and third light receiving portions disposed in a direction corresponding to a tangential direction of the optical disk, and fourth, fifth, and sixth light receiving portions disposed adjacent to respective ones of the first, second, and third light receiving portions in a direction corresponding to the radial direction, and disposed in a direction corresponding to the tangential direction to receive the sub-beam reflected from the optical disk and to convert portions of the received sub-beam into independent second electrical signals, and
    the signal processing portion generates the seek direction detecting signal using the track error signal and the second signal generated by differentiating a sum of electrical signals output from the first, third, and fifth light receiving portions, and a sum of electrical signals output from the second, fourth, and sixth light receiving portions.

8. An apparatus to generate a seek direction detectin aignal used to determine a location of a light beam incident on an optical disk, comprising
    a light dividing unit to divide a light beam into a main beam to be formed on the optical disk and a sub-beam to be formed on the optical disk and disposed in a line incident on a common track of the optical disk, the sub-beam having an optical aberration tha is not disposed on the optical disk in the line to be incident on the common track;

light receiving portions to receive the main beam and sub-beam reflected from the optical disk, and to generate first signals from the reflected main beam and second signals from the reflected sub-beam; and a signal processing portion to generate the seek direction detecting signal using the first signals and second signals.

9. The apparatus as claimed in claim 8, wherein said light receiving portions comprise first light receiving portions to receive the reflected sub-beam and to generate the first signals, and second light receiving portions to receive the reflected sub-beam and to generate the second signals, and said signal processing portion to output the seek direction detecting signal from a second processed signal and the track error signal, signal processing portion comprising:

a first signal processing portion to output the track error signal from the first signal, and a second signal processing portion to output the second processed signal from the second signals.

10. The apparatus as claimed in claim 9, wherein the second signal processing portion comprises a track cross signal generator that generates a track cross signal from the second signals.

11. The apparatus as claimed in claim 10, wherein the second optical light receiving portions comprises inner and outer light receiving portions aligned along a radial direction of the optical disk, and the inner light receiving portions being disposed between the outer light receiving portions.

12. The apparatus as claimed in claim 11, wherein the track cross signal generator comprises a differential amplifier to differentiate a first summed pair of the second signals from a first pair of the inner and outer light receiving portions and a second summed pair of the second signals from a second pair of the inner and outer light receiving portions.

13. The apparatus as claimed in claim 11, wherein a combined width of the inner light receiving portions is 0.2 to 0.8 times a diameter of a beam spot formed by the reflected sub-beam on the optical disk.

14. The apparatus as claimed in claim 11, wherein the track cross signal generator comprises a first differential amplifier to differentiate the second signals from the outer light receiving portions, a second differential amplifier to differentiate the second signals from the inner light receiving portions, a gain control unit to gain control the differentiated second signals received from the second differential amplifier, and a summing amplifier to sum the differentiated second signals from the first differential amplifier with the gain controlled second signals from the gain control unit to generate the track cross signal.

15. The apparatus as claimed in claim 9, wherein the second signal processing portion comprises a track cross signal generator that generates a track cross signal from the second signals without the first signals.

16. The apparatus as claimed in claim 15, wherein the signal processing portion generates the seek direction detecting signal by comparing a phase difference between the track cross signal and the track error signal.

17. The apparatus as claimed in claimed in claim 9, wherein the first signal processing portion comprises a push-pull signal unit that generates push-pull signals from the first signals, and the track error signal is based upon the push-pull signals.

18. The apparatus as claimed in claim 17, wherein the push pull unit comprises summing amplifiers that sum the first signals from the light receiving portions located adjacent to each other in a tangential direction of the optical disk, and the first signal processing portion further comprising a differential amplifier to differentiate the push-pull signals to output the track error signal.

19. The apparatus as claimed in claim 8, further comprising:

a light source to emit the light beam; and an objective lens to focus the main beam and sub-beam on the optical disk.

20. The optical pickup apparatus as claimed in claim 19, wherein said light receiving portions comprise first light receiving portions to receive the reflected main beam and to generate the first signals, and second light receiving portions to receive the reflected sub-beam and to generate the second signals, and said signal processing portion to output the seek direction detecting signal from a second processed signal and a track error signal, the signal processing portion comprising:

a first signal processing portion to output the track error signal from the first signals, and a second signal processing portion to output the second processed signal from the second signals.

21. The optical pickup apparatus as claimed in claim 20, wherein the first signal processing portion comprises a push-pull signal unit that generates push-pull signals from the first signals, where the track error signal is based upon the push-pull signals.

22. The optical pickup apparatus as claimed in claim 21, wherein the push pull unit comprises summing amplifiers that sum the first signals from light receiving portions located adjacent to each other in a tangential direction of the optical disk, and the first signal processing portion further comprising a differential amplifier to differentiate the push-pull signals to output the track error signal.

23. The optical pickup apparatus as claimed in claim 20, wherein said second signal processing portion comprises a track cross signal generator that generates a track cross signal included in the second processed signal from the second signals.

24. The optical pickup apparatus as claimed in claim 23, wherein the second light receiving portions comprises inner and outer light receiving portions aligned along a radial direction of the optical disk, and the inner light receiving portions being disposed between the outer light receiving portions.

25. The optical pickup apparatus as claimed in claim 24, wherein the track cross signal generator comprises a differential amplifier to differentiate a first summed pair of the second signals from a first pair of the inner and outer light receiving portions and a second summed pair of the second signals from a second pair of the inner and outer light receiving portions.

26. The optical pickup apparatus as claimed in claim 24, wherein the track cross signal generator comprises a first differential amplifier to differentiate the second signals from the outer light receiving portions, a second differential amplifier to differentiate the second signals from the inner light receiving portions, a gain control unit to gain control the differentiated second signals received from the second differential amplifier, and a summing amplifier to sum the differentiated second signals from the first differential amplifier with the gain controlled second signals from the gain control unit to generate the track cross signal.

27. The apparatus as claimed in claim 24, wherein a combined width of the inner light receiving portions is 0.2 to 0.8 times a diameter of a beam spot formed by the reflected sub- beam on the optical disk.

28. The optical pickup apparatus as claimed in claim 23, wherein the second light receiving portions comprise first, second, and third light receiving portions disposed in a tangential direction of the optical disk, and fourth, fifth, and sixth light receiving portions disposed adjacent to respective ones of the first, second, and third light receiving portions in a radial direction of the optical disk, and the second signal processing portion generates the track cross signal by differentiating a first sum of the second signals output from the first, third, and fifth light receiving portions and a second sum of the second signals output from the second, fourth, and sixth light receiving portions.

29. The optical pickup apparatus as claimed in claim 28, wherein the second signal processing portion generates the seek direction detecting signal by comparing a phase difference between the track cross signal and the track error signal.

30. The optical pickup apparatus as claimed in claim 29, wherein the sub-beam follows the main beam along the common track.

31. The optical pickup apparatus as claimed in claim 29, wherein the main beam follows the sub-beam along the common track.

32. The optical pickup apparatus as claimed in claim 29, wherein said light dividing unit further divides the light beam into an additional sub-beam disposed in the line to be incident on the common track, the additional sub-beam having an optical aberration that is not disposed in the line to be incident on the common track, and the main beam is incident between the sub-beam and sub-beam along the common track.

33. The optical pickup apparatus as claimed in claim 23, wherein the sub-beam follows the main beam along the common track.

34. The optical pickup apparatus as claimed in claim 23, wherein the main beam follows the sub-beam along the common track.

35. The optical pickup apparatus as claimed in claim 23, wherein said light dividing unit further divides the light beam into an additional sub-beam disposed in the line to be incident on the common track, the additional sub-beam having an optical aberration that is not disposed in the line to be incident on the common track, and the main beam is incident between the sub-beam and sub-beam along the common track.

36. The optical pickup apparatus as claimed in claim 20, wherein the second signal processing portion comprises a track cross signal generator that generates a trak cross signal included in the second processed signal from the second signals without the first signasl.

37. A method of generating a seek direction detecting signal, comprising:

splitting a light beam into a main beam and a sub-beam disposed to be focused on an optical disk with the main beam in a line incident on a common track of an optical disk, where the sub-beam further comprises an optical aberration not disposed in the line and incident off of the common track;

reflecting the main beam and sub-beam off the optical disk; and generating the seek direction detecting signal based upon the reflected main beam and sub-beam.

38. The method as claimed in claim 37, wherein said generating the seek direction detecting signal comprises:

generating a track cross signal based upon the reflected sub-beam;

generating a track error signal based upon the reflected main beam; and generating the seek direction detecting signal based upon the track cross signal and the track error signal.

39. The method as claimed in claim 37, wherein the track cross signal is generated without the reflected main beam.

40. An apparatus to generate a seek direction detecting signal used to determine a location of a light beam incident on an optical disk; comprising a light dividing unit to divide the light beam into a main beam to be formed on a first track of the optical disk and a sub-beam to be formed on the first track of the optical disk, the sub-beam comprising a spot focusing on the first track without being focused on a second track disposed radially apart from the first track and an optical aberration that is focused on at least the second track on the optical disk;

light receiving portions to receive the main beam and sub-beam reflected from the optical disk, and to generate first signals from the reflected main beam and second signals from the reflected sub-beam; and a signal processing portion to generate the seek direction detecting signal using the first signals and second signals.

41. The apparatus as claimed in claim 40, wherein the signal processing portion generates the seek direction detecting signal using the main and sub-beams without using another sub-beam.

42. An apparatus to generate a seek direction detecting signal for an optical pickup, comprising:

a light dividing unit to divide an incident light beam into a main beam and a sub-beam to form on an optical disk a main beam spot and a sub-beam spot, the main beam and the sub-beam being focused in a track direction of the optical disk;

an optical detector comprising a first optical detector having light receiving portions to receive the main beam reflected from the optical disk, and to convert portions of the reflected main beam into independent first electrical signals, and a second optical detector to receive the sub-beam reflected from the optical disk, and to convert portions of the received sub-beam into independent second electrical signals; and a signal processing portion to generate the seek direction detecting signal from a second electrical signal and a track error signal such that only the main and the sub-beam spots are used to generate the seek direction detecting signal, the signal processing portion comprising:

a first signal processing portion to detect the track error signal from the first electrical signals, and a second signal processing portion to generate the second signal from the second electrical signals.

* * * * *

UNITED STATES PATENT AND TRADEMARK OFFICE
CERTIFICATE OF CORRECTION

PATENT NO. : 7,120,095 B2
APPLICATION NO. : 09/815345
DATED : October 10, 2006
INVENTOR(S) : Byung-in Ma et al.

It is certified that error appears in the above-identified patent and that said Letters Patent is hereby corrected as shown below:

Column 10, line 33, change "$S_{(p3-p4)}$" to -- $S_{(p3-p2)}$ --

Column 10, line 63, change "detectin" to --detecting --

Column 10, line 64, change "aignal" to -- signal --

Column 11, lines 15 and 16, change "sub-beam" to -- main beam --

Column 11, line 24, change "signal" to -- signals --

Column 13, line 15, change "sub- beam" to -- sub-beam --

Column 13, line 45, start new paragraph after "wherein"

Signed and Sealed this

Sixth Day of February, 2007

JON W. DUDAS
*Director of the United States Patent and Trademark Office*